United States Patent [19]

Kaufman et al.

[11] Patent Number: 4,813,376

[45] Date of Patent: Mar. 21, 1989

[54] CAT LITTER TRAY

[75] Inventors: George Kaufman, No. Brunswick; Norman Usen, Marlboro, both of N.J.

[73] Assignee: Church & Dwight, Princeton, N.J.

[21] Appl. No.: 84,392

[22] Filed: Aug. 11, 1987

[51] Int. Cl.[4] ............................................. A01K 29/00
[52] U.S. Cl. ..................................................... 119/1
[58] Field of Search ............................ 119/1; 220/404

[56] References Cited

U.S. PATENT DOCUMENTS 3,154,052 10/1964 Sweeney ................................. 119/1
3,757,990 9/1973 Buth ..................................... 220/404
4,312,295 1/1982 Harrington ............................. 119/1

Primary Examiner—Robert Peshock
Attorney, Agent, or Firm—Bryan, Cave McPheeters & McRoberts

[57] ABSTRACT

A portable cat litter tray is provided which is easily converted from a closed box to an open tray. The litter tray comprises a structure movable between the closed box position and the open tray position, a clip member for imparting rigidity to the side walls of the structure when in the open tray position and, preferably, securing a cat litter-containing bay to the structure when in the open tray position.

5 Claims, 2 Drawing Sheets

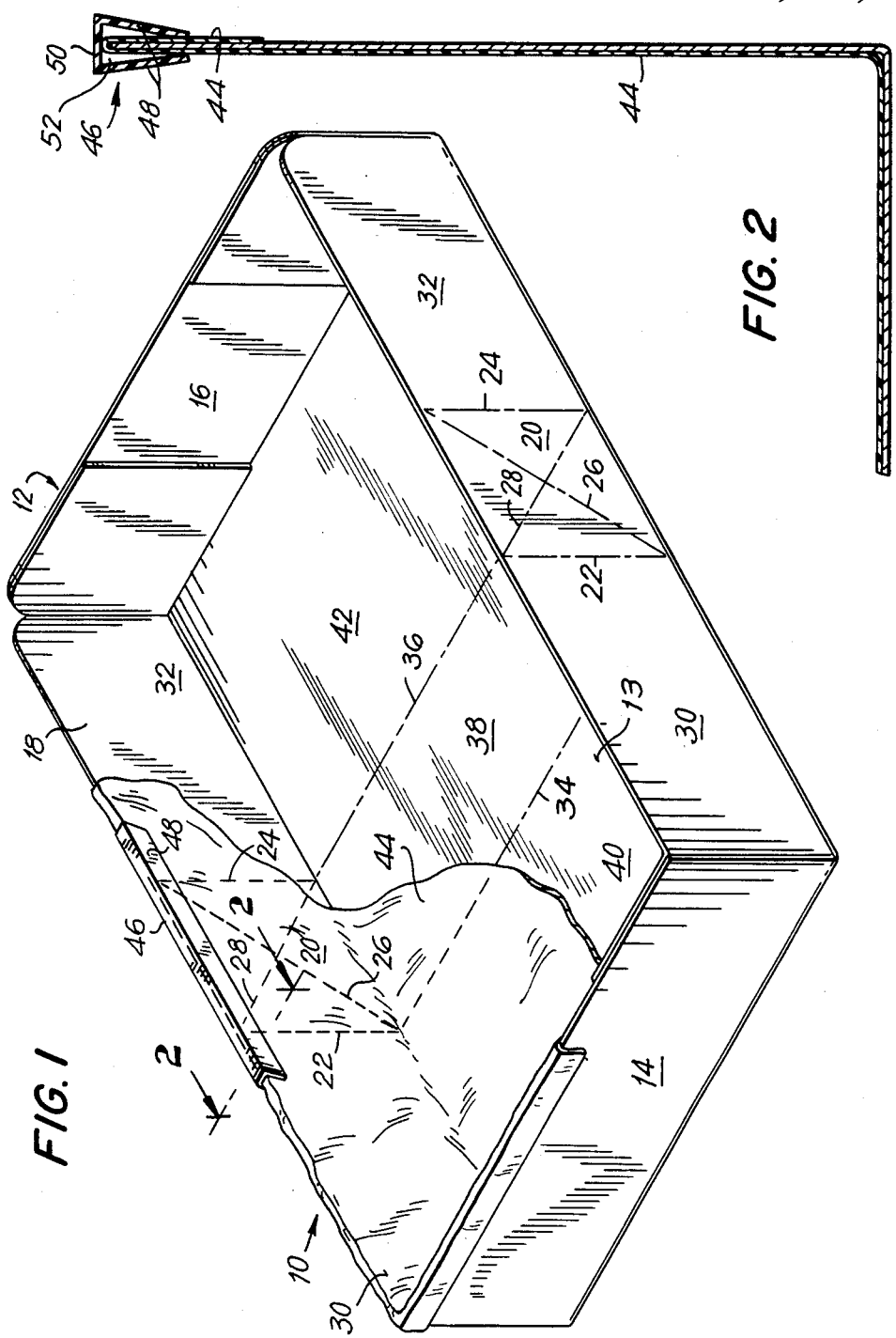

CAT LITTER TRAY

BACKGROUND OF THE INVENTION

1. Field of the Invention

The present invention relates to a convenient and portable cat litter tray. More particularly, the invention relates to a tray which is easily and quickly converted from a closed box to an open tray which may be readily stored, shipped and displayed, and utilized to dispose of used cat litter material.

2. Description of Related Art

Cat litter trays are well-known in the art and their utility to cat owners is generally recognized. Cat litter trays typically take the form of a box having a base and side walls, and are typically constructed of plastic or like materials.

Cat owners generally place commercially available cat litter material in the litter tray. After a period of use by the cat, owners dispose of the used litter material and replace it with fresh material. Typical cat litter materials include clay, zeolite, corn cob, sand, or any other insoluble absorbent granular material.

Commercially available litter trays are generally bulky and cumbersome. They are not readily stored or transported together with the litter material, nor do they lend themselves to convenient point-of-sale display.

The periodic disposal of used cat litter material is an undesirable, messy task. Also, the litter tray itself requires periodic cleaning to assure proper hygiene and to minimize odor-formation.

Accordingly, it is among the objects of the present invention to provide a litter tray which may be readily transported and displayed at the point-of-sale, and from which used litter material may be easily disposed of.

SUMMARY OF THE INVENTION

A cat litter tray is provided which comprises (a) a structure movable between an open position defining the tray and a closed position defining a box, and (b) means for securing a bag to the walls of the structure and for imparting rigidity to the side walls of the structure when in the open tray position. The side walls and the base of the structure have creased sections which permit movement of the structure between the open and closed positions. A bag containing cat litter material is suitably provided within the cat litter tray, which bag may be stored within the tray when it is in the closed position and opened up to substantially conform to the shape of the structure in the open tray position. The combination thus permits convenient storage, display and use of fresh cat litter material, and easy disposal of used litter material.

BRIEF DESCRIPTION OF THE DRAWING

The present invention will be more readily understood by reference to the following description of a preferred embodiment taken in conjunction with the accompanying drawing, wherein:

FIG. 1 is a perspective view of a litter tray of the present invention in the configuration of an open tray with a securing means fixing a bag to its walls;

FIG. 2 is a cross-sectional end view of the litter tray of FIG. 1, along line 2—2;

PREFERRED EMBODIMENT OF THE INVENTION

Figure 3:
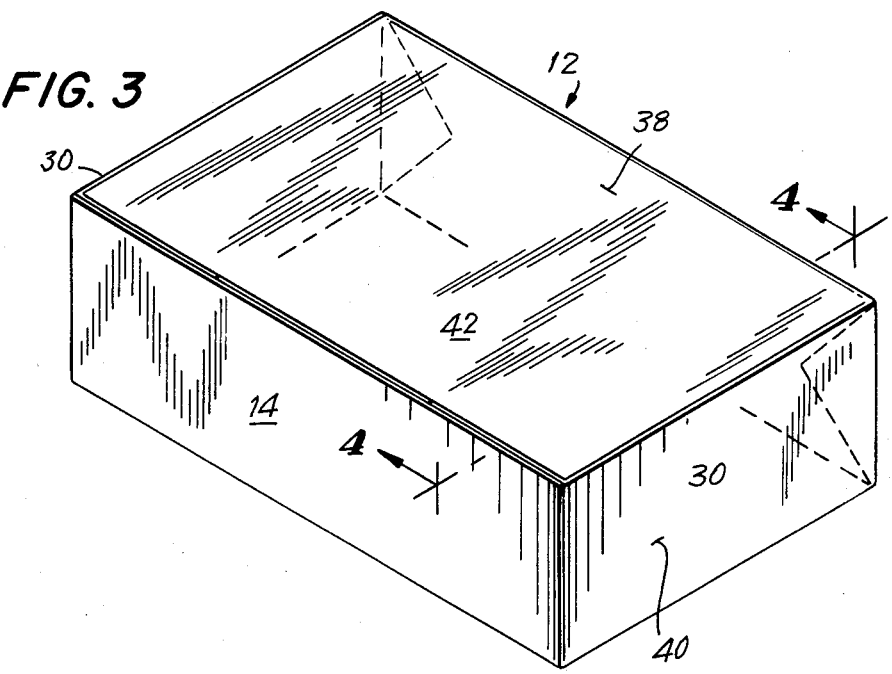
FIG. 3 is a perspective view of the litter tray in the configuration of a closed box.

The invention may be more easily understood by reference to the accompanying figures. FIG. 1 shows a perspective view of a preferred embodiment of the cat litter tray 10 of the present invention.

The litter tray 10 comprises structure 12 which comprises a base 13, opposite end walls 14 and 16, and opposite side walls 18. Each side wall 18 has a central creased section 20 bounded by opposite creases 22 and 24 which are parallel to one another. Score lines 26 and 28 crisscross each creased section 20, each score line extending diagonally from the top edge to the bottom edge of the side wall 18 and from crease 22 to opposite crease 24. In addition to creased section 20, side walls 18 comprise a first end region 30 and a second end region 32.

Creases 34 and 36 extend transversely across base 13 from one side wall 18 to the opposite side wall 18, parallel to end walls 14 and 16. Creases 34 and 36 are in alignment with creases 22 and 24 and extend from the points at which creases 22 and 24, respectively, meet the lower edges of side walls 18. The section of base 13 bounded by creases 34 and 36 is identified as base region 38. In addition to base region 38, base 13 comprises a first bottom face 40 and a second bottom face 42.

The cat litter tray may be constructed of any material which is suitable for use as a cat litter tray and which possesses the structural strength and resilience necessary to withstand the rotational movements described below. It is preferred that the material of construction be light, yet durable. Typical materials of construction include cardboard and appropriate plastics.

A bag 44 (shown in cut-away portion in FIG. 1) is secured to structure 12 by a pair of clip members 46 (only one of which is shown in the drawing, for clarity) engaging the bag walls and the respective side walls 18. Each clip member 46 also imparts rigidity to side wall 18 when in the open tray position of FIG. 1, preventing the side wall 18 from bending or collapsing along creases 22 and 24 and score lines 26 and 28.

Bag 44 comprises a sheet material which substantially conforms to the shape of structure 12 when in the open tray position of FIG. 1. The walls of bag 44 preferably drape on at least a portion of the top edge of side walls 18 and opposite end walls 14 and 16. Each clip member 46 is demountably attached to structure 12 along the top edge of side wall 18 with the walls of bag 44 interposed between the clip member 46 and the side wall 18. Bag 44 is thereby secured to structure 12. Cat litter material (not shown) is disposed within and available for use in the portion of bag 44 which lines base 13.

As shown in FIGS. 1 and 2, each clip member 46 is channel-shaped, preferably having a substantially U-shaped cross-section comprising tapered side walls 48 and a top face 50, defining a groove 52. Groove 52 extends the length of clip member 46. Groove 52 is defined such that, when structure 12 is in the open tray position of Figs. 1 and 2, the top edge of side wall 18 and the draped portion of bag 44 may be interposed therein. Thus, clip member 46 secures bag 44 to structure 12 along the top edge of side wall 18. As will be readily apparent, additional clip members may be employed, if desired, to secure additional draped portions of bag 44 to the top edges of end walls 14 and 16 and side walls 18.

Alternatively, it is within the purview of the present invention to utilize only a single clip member on each side wall 18 to both secure the litter bag and rigidify the tray structure in the open position for use.

As shown in FIG. 1, clip member 46 is at least as long as and, preferably, longer than the top edge of creased section 20. In such a preferred embodiment, a single clip member 46 is demountably attached to each side wall 18 at least in the vicinity of creased sections 20 and preferably so as to extend beyond creases 22 and 24 thereby imparting rigidity to the side walls 18 of structure 12 when in the open tray position. Alternatively, it is also within the scope of the present invention to provide a plurality of shorter clip members on one or both side walls 18 to accomplish the same result.

Structure 12 is movable between an open position defining a tray, as shown in FIG. 1, and a closed position defining a box, as shown in FIG. 3. Clip member 46 is removed from structure 12 before moving structure 12 between said positions, thereby freeing bag 44 from side wall 18. Bag 44 is typically closed by means of a tie after being freed from side wall 18 to isolate the cat litter material therein.

Movement from the open position of FIG. 1 to the closed position of FIG. 3 is accomplished by rotating second bottom face 42 and base region 38 radially upward. This rotation causes base 13 to bend along crease 34. Side walls 18 collapse inwardly along creases 22 and score lines 26. Further rotation of second bottom face 42 beyond a point at which second bottom face 42 and base region 38 are approximately perpendicular to first bottom face 40 causes base 13 to bend along crease 36. Side walls 18 collapse inwardly along creases 24. The creased sections 20 collapse along score lines 28. Further radial rotation around crease 36 thus moves structure 12 into a closed position defining a box, as shown in FIG. 3.

When in the closed position of FIG. 3, structure 12 is defined by end wall 14 and base region 38, first end regions 30, first bottom face 40, and second bottom face 42. As will be apparent to one skilled in the art, in order for the respective sections of the tray structure to nest in the closed position of FIG. 3, the first end regions 30 must be longer than the second end regions 32. Similarly, first bottom face 40 must be longer than second bottom face 42. Thus, in the closed position of FIG. 3, end wall 16 is within opposite end wall 14 and second end regions 32 are within first end regions 30.

Figure 4:
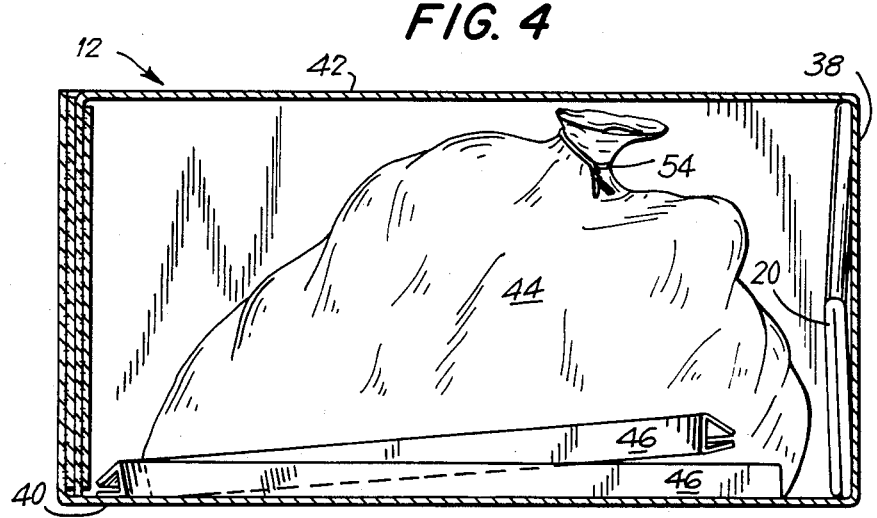
FIG. 4 is a cross-sectional end view of the litter tray of FIG. 3 along line 4—4, with a bag and the securing means contained therein.

FIG. 4 shows structure 12 in the closed position of FIG. 3, substantially along line 4—4. Bag 44, which is closed by a tie 54, and clip members 46 are contained within structure 12. Bag 44 preferably contains cat litter material. Opposite end wall 16 is positioned within end wall 14 and collapsed central region 20 is positioned adjacent base region 38.

The cat litter tray thus provided may be readily stored and transported, either with or without the prepackaged cat litter material provided within a bag stored therein. The tray may be easily converted from a closed box to an open tray, with the clip members holding the side walls of the tray structure in the open position and securing the bag containing the cat litter material for point-of-sale display and subsequent use. Finally, the cat litter bag may be readily removed from the open bag and sealed and the used cat litter material disposed of, either by separate disposal of the bag or by closing the tray containing the bag and disposing of the entire assembly. There is thus provided a cat litter tray which is inexpensive and may be readily stored, transported, displayed, used and disposed of.

It will be understood that various changes may be made in the preferred embodiment of the cat litter tray described hereinabove without departing from the scope of the present invention.

Having thus described the invention, what is claimed is:

1. A cat litter tray which comprises:
   (a) a structure movable between an open position defining the tray and a closed position defining a box, wherein said structure in the open position comprises:
      (i) a base having a creased section permitting movement of the structure between the open and closed positions;
      (ii) opposite end walls integral with said base; and
      (iii) opposite side walls integral with said base and said end walls, each of said side walls having a creased section permitting movement of the structure between the open and closed positions; and
   (b) means for securing a bag to the walls of the structure and for imparting rigidity to the side walls of the structure when in the open position, said means comprising a pair of clip members each of which is substantially U-shaped in cross-section and is at least as long as the creased sections of said side walls, said clip members being adapted to fit over portions of the bag when it is draped on at least said creased sections to secure the bag to said creased sections and hold the side walls in said open position.

2. The cat litter tray of claim 1, further comprising:
   (c) said bag, containing cat litter material and being stored within the structure when it is in the closed position.

3. The cat litter tray of claim 2, wherein the walls of the bag are draped on the side and end walls of the structure, and the clip members fit over the bag wall and secure the bag to the creased sections of the respective side walls.

4. A cat litter tray, which comprises:
   (a) a structure movable between an open position defining the tray and a closed position defining a box, wherein said structure in the open position comprises:
      (i) a base having a first and second crease extending parallel to one another and transversely thereof;
      (ii) opposite end walls integral with said base; and
      (iii) opposite side walls integral with said base and said end walls, each of said side walls having a third and fourth crease extending parallel to one another, perpendicular to said base, and in alignment with said first and second creases, respectively, and a pair of diagonal score lines extending between opposite ends of the third and fourth creases; and
   (b) means for securing a bag to at least the side walls of the structure and for imparting rigidity to said side walls of the structure when it is in the open position, said means comprising a pair of clip members each of which is substantially U-shaped in cross-section and is at least as long as the distance between said third and fourth creases, said clip members being adapted to fit over portions of the bag when it is draped on the side and end walls of the structure, to secure the bag to the side walls throughout at least the region between the third and fourth creases formed therein, and to hold the side walls in their open position.

5. The cat litter tray of claim 4, further comprising:
(c) said bag, containing a cat litter material, being closed and stored within the structure when the structure is in the closed position and being opened and draped on the side and end walls of the structure and generally conforming to the shape of the structure when the structure is in the open position; and wherein the clip members engage the walls of the bag at least in the areas adjacent the third and fourth creases in the side walls of said structure to secure the bag to the structure and hold the side walls in the open position.

* * * * *